Jan. 26, 1971  W. KRANICH  3,558,234
RETRACTABLE BALLPOINT PEN
Filed March 25, 1969  3 Sheets-Sheet 1

Inventor:
Werner Kranich
By: Spencer & Kaye
Attorneys

Jan. 26, 1971 W. KRANICH 3,558,234
RETRACTABLE BALLPOINT PEN
Filed March 25, 1969 3 Sheets-Sheet 2
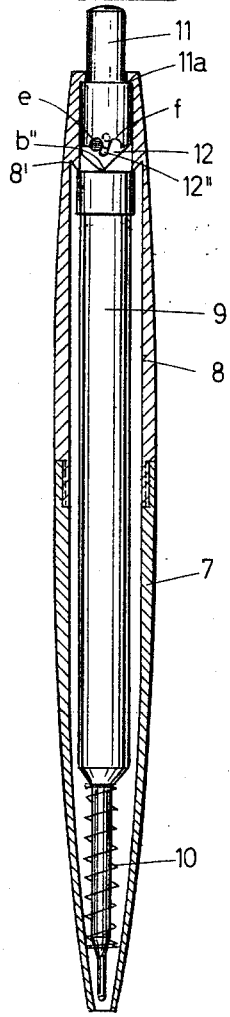
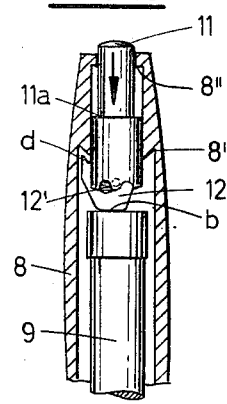
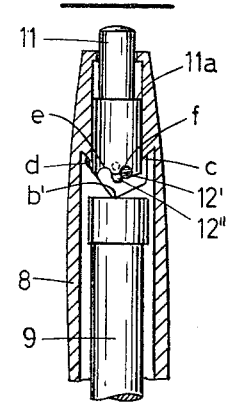
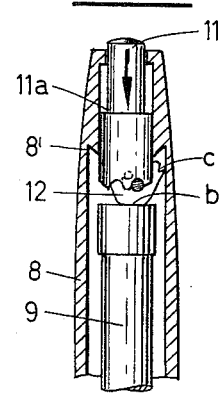
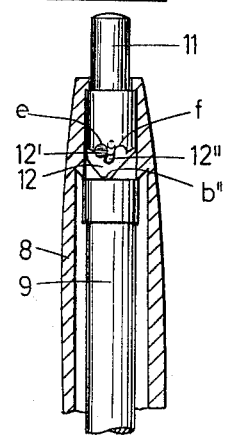
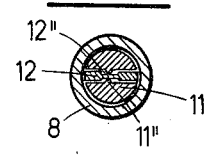
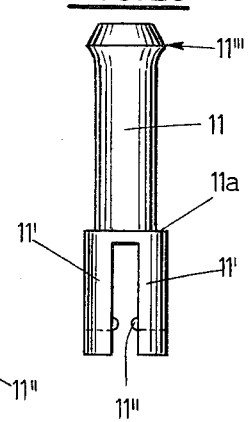
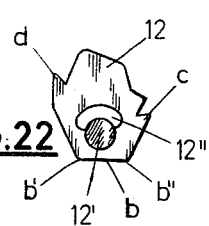
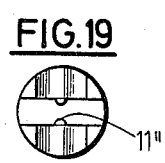
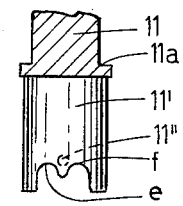
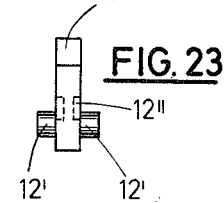
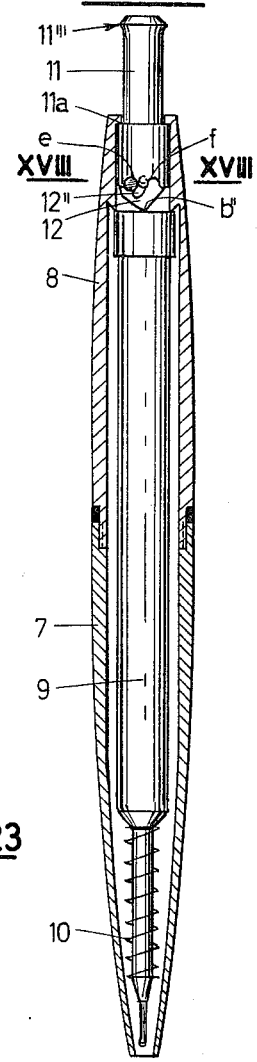

United States Patent Office 3,558,234
Patented Jan. 26, 1971

3,558,234
RETRACTABLE BALLPOINT PEN
Werner Kranich, Rosstal, near Nuremberg, Germany, assignor to A. W. Faber-Castell, Stein, near Nuremberg, Germany, a firm of Germany
Filed Mar. 25, 1969, Ser. No. 810,169
Claims priority, application Germany, Mar. 29, 1968, 1,761,066; Nov. 16, 1968, 1,809,398
Int. Cl. B43k 24/08
U.S. Cl. 401—112                                                         6 Claims

ABSTRACT OF THE DISCLOSURE

The specification describes a retractable ballpoint pen, in which a tiltable control member is interposed between the axially pressable operating pushbutton and the refill. When the pushbutton is pressed the control member is urged forward against a spring and laterally so that a latch thereon engages an abutment. Subsequently the control member tilts and is retained also by a second latch engaging a second abutment. When the pushbutton is pressed again, the first latch releases and the control member tilts back to disengage the second latch and the control member and refill retract.

---

The present invention relates to a retractable ballpoint pen having a housing, in which the refill is axially displaceable against the action of a restoring spring and is advanced by means of an operating member arranged at the top of the housing and itself projects from the bottom of the housing, the operating member being connected with the refill via a tiltable control member which is freely displaceable in the casing and this control member in the advanced position for writing of the pen refill engages an abutment shoulder inside the hollow shaft.

Although the use of a tiltable control member is very advantageous due to the relatively simple construction of the control mechanism, such control mechanisms have suffered from serious deficiencies. The use, up to the present, of two abutment shoulders arranged inside the hollow shaft on opposite sides and at different distances from the bottom of the housing requires a forcibly actuated operating member and a relatively long tiltable control member.

In one known design, the tiltable control member is in the form of a long flat anchor which must be stable so that a reliable control of tilting from the operating member is possible. The operating member must also be stable and additionally have a forcible restoring action to permit the tilting process. The refill must for this reason be accurately axially located. To ensure reliable operation with the above mechanism at least five structural members are necessary, thereby making assembly relatively complicated.

In a further known mechanism the tiltable member is a long coupling pin provided with a collar, which for operation is located in a hollow space. Here again to bring about the tilting process a forcible restoring of the operating member and an axial operation of the refill end are necessary. This mechanism requires four structural members and the manufacture there of is relatively complicated.

It has also been proposed to mount an elongated, flat tiltable control member in a pivotal manner in the operating member, which then acts directly on the edge of the refill tube end, however, the expenditure here is even greater and in addition a special pen refill with flayed edge is necessary. In a further known construction, also having two oppositely arranged abutment shoulders and an elongated round tiltable control member a restoring spring in the form of a volute spiral spring is used for the axial operation of the refill. Although only two structural members are required for the operating mechanism, the manufacture and assembly thereof is still relatively complicated, as the operating member must be inserted and operated in such a way that it will not rotate. In addition, with all the above designs, due to the elongation of the tilting member a considerable structural length of the upper part of the casing is necessary.

According to the invention there is provided a retractable ballpoint pen comprising a two-part hollow housing, at least one ballpoint refill in said housing, and axially movable from an advanced position in which it protrudes from the bottom of the housing, and a retracted position in which it is entirely within said housing, an axially movable operation member passing through an aperture in the top of the housing, a tiltable control member located within said housing and interposed between said operating member and said refill, a spring urging the control member towards the top of the housing, first and second abutments formed on the interior of the housing, first and second latches formed on the control member and abutting surfaces formed on the control member and operating member, so that on initial depression of said operating member the control member is urged axially forward and laterally, to move the first latch into engagement with the first abutment, said control member subsequently being tilted back by the spring to a position in which the second latch is also in engagement with the second abutment, the abutting surfaces, on subsequent depression of said operating member, urging said control member axially forward and laterally in the opposite direction, whereby the first latch is disengaged from the first abutment, enabling said control member subsequently to tilt again and disengage the second latch from the second abutment.

In order that the invention may readily be understood, the following description is given, merely by way of example, reference being made to the accompanying drawings, in which:

FIG. 12 is a longitudinal section through a second embodiment of pen with a large capacity refill;

FIG. 13 is a longitudinal section through the upper part of the pen of FIG. 12 in the refill advance position;

FIG. 14 is a similar view with the refill in the advanced position;

FIG. 15 is a similar view and the operating member depressed to retract the refill;

FIG. 16 is a similar view with the refill in the full retracted position;

FIG. 17 is a view similar to FIG. 12, in which the operating member is of a modified form;

FIG. 18 is a cross-section on the line XVIII—XVIII of FIG. 17;

FIG. 19 is an underneath plan of the operating member of FIGS. 12 to 18;

FIG. 20 is a side view of the operating member of FIG. 19;

FIG. 21 is a partial longitudinal section through the operating member of FIG. 20;

FIG. 22 is a front view of the tiltable control member of the pen of FIGS. 12 to 18;

FIG. 23 is a side view of the member of FIG. 22;

The retractable ball-point pen shown in FIGS. 1 to 11 consists of a two-part hollow housing 1, 2 in which is mounted a pen refill 3 and an operating mechanism 5, 6. The longitudinally displaceable pen refill 3 is continuously pressed upwardly by a restoring spring 4 against the mechanism 5, 6, the spring 4 abutting against the inside of the neck of the hollow-space of the housing and a bulge 3' formed by upsetting the pen refill 3.

Figure 1:
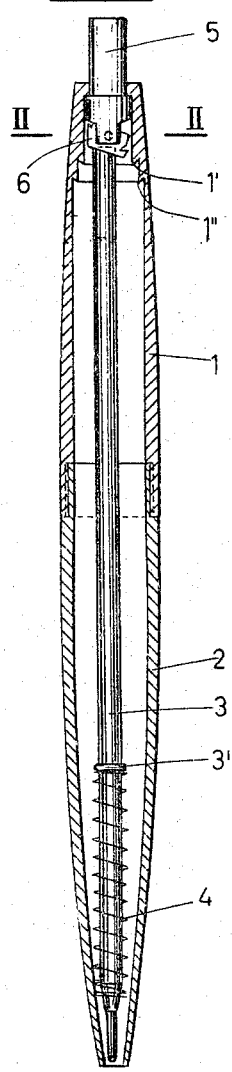
FIG. 1 is a longitudinal section through one embodiment of ballpoint pen according to the invention.
Figure 3:
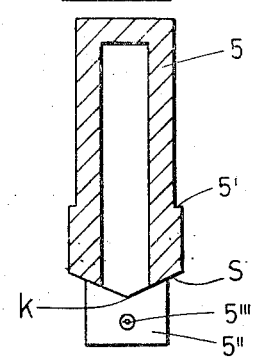
FIG. 3 is an enlarged longitudinal section through the operating member of the pen of FIG. 1.
Figure 4:
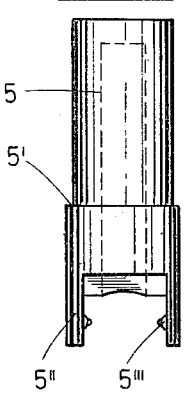
FIG. 4 is a side view of the operating member of FIG. 3.

In the upper part 1 of the housing, the operating member 5 is axially displaceable in an aperture in such a way that a part thereof protrudes from the upper part 1 and the rearward position is delimited by a stop 5' (FIG. 4). On the side facing the refill the operating member 5 has two inclined flat surfaces S at an obtuse angle to another (FIG. 3). Between the refill 3, which is continuously forced back by the restoring spring 4 and the operating member 5 is arranged on approximately parallelogram shaped tiltable control member 6 at right angles to the pin axis (FIGS. 5 and 6), the control member being faced with two latches 6' and 6" at diametrally opposite corners, adjacent the side surfaces of the control member. The bottom surface of the latter is formed with a recess a for taking the end of the ball pen refill 3 and the top surface g abuts alternately on one of the inclined flat surfaces of the operating member. The control member carries the two latches 6' and 6", latch 6' being located in proximity to the sliding edge g and latch 6" correspondingly lower. These latches 6' and 6" interact with first and second concentrically arranged abutment shoulders 1' and 1" of the housing upper part 1 (FIG. 1).

On the operating member 5 are arranged, as seen in FIGS. 3 and 4, two lateral downwardly extending lugs 5" which laterally embrace the control member 6 and give it the necessary lateral guidance. On the lugs 5" are arranged inwardly projecting pins 5''' which engage in oval relatively large recesses v of the control member 6, without restricting the necessary freedom of movement. This arrangement ensures that the tiltable control member 6 is undetachably connected to the operating member 5.

Figure 7:
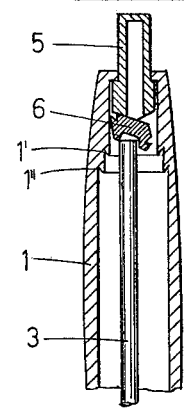
FIG. 7 is a simplified longitudinal section through the pen of FIG. 1 with the refill retracted.
Figure 5:
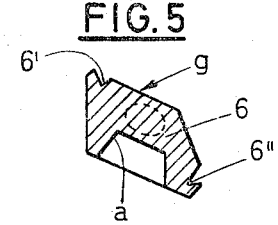
FIG. 5 is an enlarged longitudinal section through the tiltable control member of the pen of FIG. 1.
Figure 6:
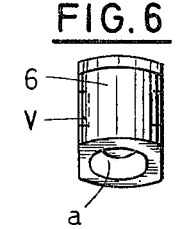
FIG. 6 is a side view of the member of FIG. 5.
Figure 8:
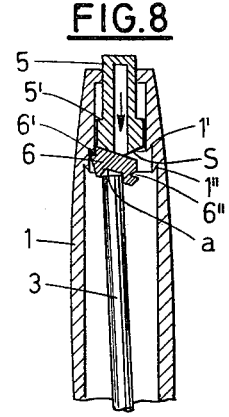
FIG. 8 is a partial longitudinal section through the upper part of the pen of FIG. 7 during the advance of the refill.
Figure 10:
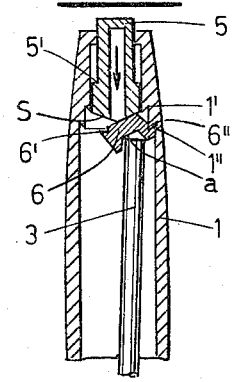
FIG. 10 is a similar view, with the operating member pressed to retract the refill.
Figure 9:
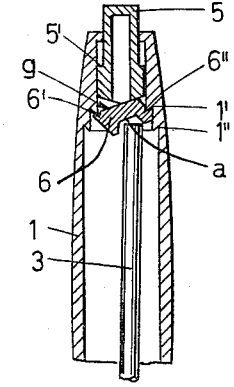
FIG. 9 is a similar view with the refill in the advanced position.
Figure 11:
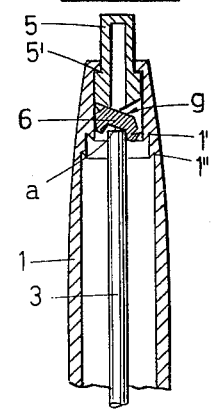
FIG. 11 is a similar view with the refill in the fully retracted position.
Figure 2:
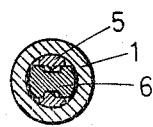
FIG. 2 is a cross-section through the pen of FIG. 1, taken along the section line II—II.

In the retracted position shown in FIG. 7, the restoring spring 4 pushes the refill 3 against the tiltable control member 6 which in turn is urged against the operating member 5, the stop 5' of which engages on the ledge surrounding the aperture in the top of the housing. The tiltable control member abuts with its sliding edge g on the left-hand inclined flat surface of the operating member 5. By forcing forward the operating member 5 as shown in FIG. 8, the control member moves axially forward and laterally, so that the latch 6' engages on the annular abutment shoulder 1'. On releasing the pressure, due to the locking of the latch 6' the control member 6 pivots round the tilting edge k to the transverse position of FIG. 9, whereby the latch 6" engages on the opposite edge of the abutment shoulder 1'. This transverse position of the control member 6 represents the forward or advanced refill writing position.

If the refill is to be released, as seen in FIG. 10, pressure is again applied to the operating member 5, the control member 6 is caused to slide laterally in the opposite direction on the right hand inclined flat surface s of the pressure member 5 and finally the lower-lying latch 6" engages on the abutment shoulder 1". On releasing the pressure the control member 6 tilts so far that the latch 6' pivots past the abutment shoulders 1' and finally slides back into the original position.

As a result of the undetachable connection of the pressure member 5 with the control member 6 and the abutment shoulder 1' and 1" being placed therearound a favourable, position-independent assembly of this simple but extremely operationally stable operating arrangement for writing implements is guaranteed.

A further embodiment of the invention, for a ball pen with large capacity refill is shown in FIG. 12. Here again the ball pen comprises a two-part hollow housing 7, 8, a large capacity refill 9, a restoring spring 10 and operating mechanism 11, 12.

The operating member 11 is inserted in an axially displacable manner into the housing upper part 8 in such a way that a part thereof protrudes therefrom and the rearward position is delimited by the stop of the shoulder 11a of the push button on the rim 8" surrounding the aperture in the shaft upper part 8. The operating member 11, via the tiltable control element 12, is operatively connected with the large capacity refill 9. Lateral lugs 11' of the operating member 11, as shown in FIGS. 13 to 16, are engaged by two pins 12' either in a first pair of opposite recesses e or a second pair of opposite recesses f. The flat control member 12 has, as seen in FIGS. 19–23, two latches c and d which, in the advanced position, engage on the concentric abutment shoulder 8' provided in the hollow shaft upper part 8. Inwardly directed pins 11" are arranged on the later lugs 11'; and these engage in guide grooves 12", (FIGS. 22 and 23) and thereby undetachably connect the control member 12 without hindrances of movement with the operating member 11.

In the retracted position of FIGS. 12 and 17, due to the action of the restoring spring 10 the refill 9 presses the tiltable control member 12 against the operating member 11, whereby the shoulder 11a engages on the housing surrounding the hole 8" of the housing upper part 8 and the edge b" on the refill end. The pins 12' of the control member 12 are hereby located in the recesses e of the operating member 11.

By advancing the operating member 11, the latch d of the control member 12 rests behind the abutment shoulder 8' of the upper part 8 and, on releasing the pressure, the control member 12 tilts round the edge of the abutment shoulder 8' in such a way that the other latch c of the control member 12 engages on the abutment shoulder 8', whereby the pins 12' of the control member 12 move over into the recesses f of the operating member. Thereby the advanced position shown in FIG. 14 is obtained, where the edge b' abuts on the refill end.

On again advancing the operating member 11 the latch d disengages from the abutment 8' (FIG. 15) and the operating member 11 returns to the rest position, whereby the pins 12' of the control member 12 as a result of the tilting return to the recess e, whereby the starting position of FIG. 16 is again attained.

In the embodiment of FIGS. 17 to 20, at the upper end of the operating member 11 a bead 11''' is provided, which prevents the mechanism 11 and 12 from falling out of the upper part 8 when changing the refill 9.

Figure 24:
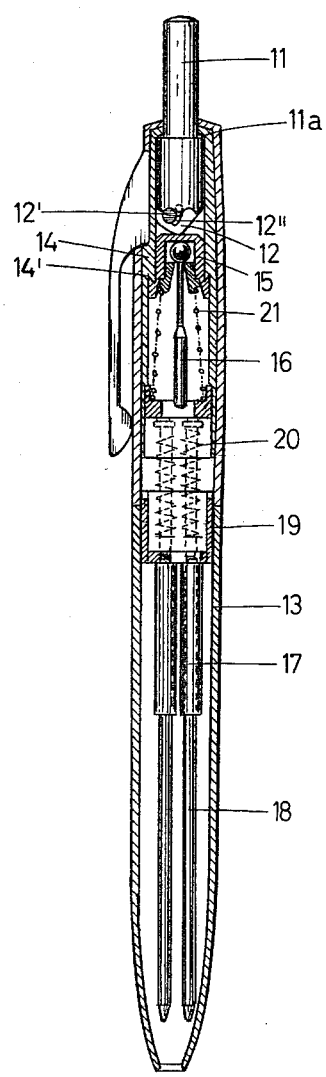
FIG. 24 is a longitudinal view of a third embodiment of pen according to the invention, with the refills in the fully retracted position.
Figure 25:
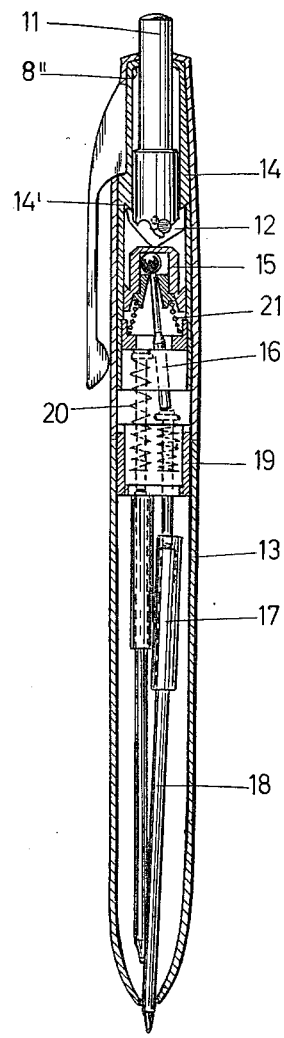
FIG. 25 is a similar view with one of the refills in the writing position.

The embodiment of FIGS. 24 to 25 shows the use of the pressure mechanism according to the invention of a multicolour change ball point pen with colour selection by changing the position of a pendulum means with an all-metal design of the housing.

The housing comprises a lower part 13 and an upper part 14, these two parts being connected by the intermediate part 19 which forms a refill guide bearing.

In the intermediate part 19 are located, in known manner, refill guides with restoring springs 20 and refill-carrying casings 17, short ball-point pen refills being used.

In the upper part 14, above the refill mounting 19, are located a conical restoring spring 21 with the upper part 15 carrying a pendulum arrangement 16. The inner hole of the upper part 14 again has the concentric control shoulder 14'. The operating process of the control mechanism corresponds to that of the embodiment shown in FIGS. 12 to 16, in which the conical restoring spring 21 takes over the function of restoring spring 10 and the upper part 15 corresponds to the upper end of the large capacity refill 9.

I claim:

1. A retractable ballpoint pen comprising, in combination:
  (a) a two-part hollow housing;
  (b) at least one ballpoint refill in said housing, and axially movable from an advanced position in which it protrudes from the bottom of the housing, and a retracted position in which it is entirely within said housing;
  (c) an apparatus in the top of the housing;
  (d) an operating member formed with lateral downwardly extending lugs and passing through said aperture and axially movable therein;
  (e) a tiltable control member guided by the lugs on said operating member and having top, bottom and side surfaces defining a substantially parallelogram shape and located within said housing and interposed between said operating member and said refill;
  (f) spring means urging said control member towards the top of said housing;
  (g) a first and second abutment formed on the interior of said housing;
  (h) first and second latched formed on said control member and disposed diagonally opposite adjacent the side surfaces of said control member; and
  (i) abutting surfaces formed on said control member and operating member, effective on initial depression of said operating member to urge said control member axially forward and laterally whereby said first latch is moved into engagement with said first abutment, said control member subsequently being tilted back by said spring means to a location in which said second latch is also in engagement with said second abutment, said abutting surface being effective on subsequent depression of said operating member to urge said control member axially forward and laterally in the opposite direction, whereby said first latch is disengaged from said first abutment, enabling said control member subsequently to be tilted again and disengage said second latch from said second abutment.

2. A ballpoint pen as claimed in claim 1, wherein inwardly projecting pins are formed on said lugs, and wherein said control member is formed with oval recesses in which said pins engage, effective to mount said control member for tilting motion.

3. A retractable ballpoint pen comprising, in combination:
  (a) a two-part hollow housing;
  (b) at least one ballpoint refill in said housing, and axially movable from an advanced position in which it protrudes from the bottom of the housing, and a retracted position in which it is entirely within said housing;
  (c) an aperture in the top of the housing;
  (d) an operating member formed with two pairs of interconnected recesses and passing through said aperture and axially movable therein;
  (e) a tiltable control member located within said housing and interposed between said operating member and said refill and having two pins engageable with either pair of said recesses;
  (f) spring means urging said control member towards the top of said housing;
  (g) a first and second abutment formed on the interior of said housing;
  (h) first and second latches formed on said control member; and
  (i) abutting surfaces formed on said control member and operating member by said pins and said recesses, respectively, effective on initial depression of said operating member to urge said control member axially forward and laterally whereby said first latch is moved into engagement with said first abutment, said control member subsequently being tilted back by said spring means to a location in which said second latch is also in engagement with said second abutment, said abutting surface being effective on subsequent depression of said operating member to urge said control member axially forward and laterally in the opposite direction, whereby said first latch is disengaged from said first abutment, enabling said control member subsequently to be tilted again and disengage said second latch from said second abutment.

4. A ballpoint pen as claimed in claim 3, wherein said operating member is formed with lateral downwardly extending lugs for guiding the control member and wherein inwardly projecting pins are formed on said lugs, and wherein said control member is formed with oval recesses in which said pins engage, effective to mount said control member for tilting motion.

5. A ballpoint pen as claimed in claim 3, wherein a shoulder is formed on said operating member and engage said housing surrounding aperture, to define the retracted position of said operating member.

6. A ballpoint pen as claimed in claim 3, wherein a bead is formed on the upper end of said operating member to prevent said operating member from falling into the housing upon charging of a refill.

References Cited

UNITED STATES PATENTS

| | | | |
|---|---|---|---|
| 3,062,191 | 11/1962 | Van Haltern, Jr., et al. | 401—110 |
| 3,289,639 | 12/1966 | Lovejoy | 401—112 |

FOREIGN PATENTS

| | | | |
|---|---|---|---|
| 1,114,900 | 5/1968 | Great Britain | 401—112 |

LAWRENCE CHARLES, Primary Examiner